(12) United States Patent
Pratt

(10) Patent No.: US 9,739,397 B2
(45) Date of Patent: Aug. 22, 2017

(54) SUPPORT ASSEMBLY AND COMPONENTS

(71) Applicant: COMPANY BLACK LLC, Bedford, PA (US)

(72) Inventor: William K. Pratt, Bedford, PA (US)

(73) Assignee: COMPANY BLACK LLC, Bedford, PA (US)

( * ) Notice: Subject to any disclaimer, the term of this patent is extended or adjusted under 35 U.S.C. 154(b) by 0 days.

(21) Appl. No.: 15/208,160

(22) Filed: Jul. 12, 2016

(65) Prior Publication Data

US 2016/0319961 A1 Nov. 3, 2016

Related U.S. Application Data

(63) Continuation-in-part of application No. 14/535,818, filed on Nov. 7, 2014, now Pat. No. 9,440,771, and a continuation-in-part of application No. 14/613,472, filed on Feb. 4, 2015, now Pat. No. 9,440,772.

(51) Int. Cl.
| B65D 19/00 | (2006.01) |
| F16L 3/00 | (2006.01) |
| B65D 19/44 | (2006.01) |
| F16L 1/036 | (2006.01) |
| F16L 1/024 | (2006.01) |
| F16L 1/10 | (2006.01) |
| B23K 37/04 | (2006.01) |
| B23K 101/10 | (2006.01) |

(52) U.S. Cl.
CPC ............ *F16L 3/00* (2013.01); *B23K 37/0426* (2013.01); *B65D 19/0085* (2013.01); *B65D 19/44* (2013.01); *F16L 1/0246* (2013.01); *F16L 1/036* (2013.01); *F16L 1/10* (2013.01); *B23K 2201/10* (2013.01); *B65D 2519/00019* (2013.01); *B65D 2519/00054* (2013.01); *B65D 2519/00273* (2013.01); *B65D 2519/00293* (2013.01); *B65D 2519/00333* (2013.01); *B65D 2519/00562* (2013.01); *B65D 2519/00567* (2013.01); *B65D 2519/00796* (2013.01); *B65D 2519/00815* (2013.01); *B65D 2519/00825* (2013.01)

(58) Field of Classification Search
CPC .......... B65D 2519/00562; B65D 2519/00825; B65D 2519/00567; B65D 19/20; B65D 19/385; B65D 19/44; B65D 19/0085; B65D 2519/00019; B65D 2519/00054; B65D 2519/00273; B65D 2519/00293; B65D 2519/00333; B65D 2519/00796; B65D 2519/00815; F16L 3/00; F16L 1/10; F16L 1/036; F16L 1/0246; B23K 37/0426; B23K 2201/10
See application file for complete search history.

(56) References Cited

U.S. PATENT DOCUMENTS

| 1,201,981 A | 10/1916 | Pitcher |
| 2,506,346 A | 5/1950 | Crawford |
| 2,716,532 A | 8/1950 | Wysong, Jr. et al. |

(Continued)

FOREIGN PATENT DOCUMENTS

FR 3 006 413 A1 12/2014

*Primary Examiner* — Hanh V Tran
(74) *Attorney, Agent, or Firm* — Vorys, Sater, Seymour and Pease LLP

(57) ABSTRACT

A support assembly for constructing and staging a pipeline for installation in a trench. The support assembly includes one or more stacks of support segments. A support segment for the support assembly. Method of using and making the support segments.

1 Claim, 9 Drawing Sheets

(56) References Cited

U.S. PATENT DOCUMENTS

| | | |
|---|---|---|
| 2,589,651 A | 3/1952 | Ballard |
| 2,626,456 A | 1/1953 | Harrison |
| 2,774,490 A | 12/1956 | Strong |
| 2,803,363 A | 8/1957 | Hutchinson |
| 2,997,266 A | 8/1959 | Munroe |
| 2,913,206 A | 11/1959 | Paris |
| 3,167,038 A | 1/1965 | Brown |
| 3,288,311 A | 6/1966 | Beattie |
| 3,302,593 A | 2/1967 | Roberts |
| 3,472,363 A | 10/1969 | Overton |
| 3,520,258 A | 7/1970 | Shepherd |
| 3,587,479 A | 6/1971 | Geschwender |
| 3,589,309 A | 6/1971 | Clark, Jr. |
| 3,753,407 A | 8/1973 | Tilseth |
| 3,838,632 A | 10/1974 | Miyake |
| 3,907,241 A | 9/1975 | Oglesby et al. |
| 4,093,760 A | 6/1978 | O'Malley |
| 4,170,451 A | 10/1979 | Luff |
| 4,195,732 A | 4/1980 | Bell |
| 4,220,099 A | 9/1980 | Marchesano |
| 4,241,810 A | 12/1980 | Newlon |
| 4,253,826 A | 3/1981 | Campbell, Jr. |
| 4,305,508 A | 12/1981 | Rodgers |
| 4,382,733 A | 5/1983 | Rodgers |
| 4,405,673 A | 9/1983 | Fridley et al. |
| 4,428,893 A | 1/1984 | Cummings, Jr. et al. |
| 4,501,402 A | 2/1985 | Saito et al. |
| 4,747,775 A | 5/1988 | Takagi et al. |
| 4,898,102 A | 2/1990 | Thebeau |
| 5,092,367 A | 3/1992 | Gilleland |
| 5,184,558 A | 2/1993 | Wozniacki |
| 5,191,740 A | 3/1993 | Rose |
| 5,207,631 A | 5/1993 | Schmidtke et al. |
| 5,218,913 A | 6/1993 | Winebarger et al. |
| 5,230,291 A | 7/1993 | Juvik-Woods |
| 5,357,875 A | 10/1994 | Winebarger et al. |
| 5,386,786 A | 2/1995 | Kilpatrick et al. |
| 5,425,314 A | 6/1995 | MacFarland |
| 5,427,019 A | 6/1995 | Moorman |
| 5,461,988 A | 10/1995 | Cummings et al. |
| 5,465,672 A | 11/1995 | Boyse et al. |
| 5,487,345 A | 1/1996 | Winebarger et al. |
| 5,490,465 A | 2/1996 | Hoyt et al. |
| 5,515,977 A | 5/1996 | Lambert |
| 5,531,166 A | 7/1996 | Woods et al. |
| 5,537,937 A | 7/1996 | Juvik-Woods |
| 5,568,774 A | 10/1996 | Hutchison |
| 5,685,233 A | 11/1997 | DeJean |
| 5,685,234 A | 11/1997 | Grigsby et al. |
| 5,799,584 A | 9/1998 | Campbell |
| 5,941,177 A | 8/1999 | Auderson |
| 5,996,509 A | 12/1999 | Lai |
| 6,076,475 A | 6/2000 | Kuhn et al. |
| 6,135,030 A | 10/2000 | Besaw |
| 6,155,181 A | 12/2000 | Chilcutt |
| 6,550,741 B1 | 4/2003 | Cottone |
| 6,672,029 B2 | 1/2004 | Tucker |
| 7,503,727 B2 | 3/2009 | Ingebretsen et al. |
| 7,959,059 B2 | 6/2011 | Tamamori et al. |
| 8,113,129 B1 | 2/2012 | Hurley et al. |
| 8,127,929 B1 | 3/2012 | Lu et al. |
| 8,469,085 B2 | 6/2013 | Orgeron |
| 8,544,814 B2 | 10/2013 | Diaz |
| 9,174,768 B2 | 11/2015 | Love |
| 2002/0189507 A1 | 12/2002 | Benner |
| 2007/0237612 A1 | 10/2007 | Mammome et al. |
| 2007/0256614 A1 | 11/2007 | Chen |
| 2010/0078429 A1 | 4/2010 | Strang et al. |
| 2012/0204767 A1 | 8/2012 | Jian et al. |
| 2012/0260832 A1 | 10/2012 | Linares |
| 2013/0115010 A1 | 5/2013 | Connors et al. |
| 2013/0216339 A1 | 8/2013 | Apps et al. |
| 2013/0343834 A1 | 12/2013 | Flusche |

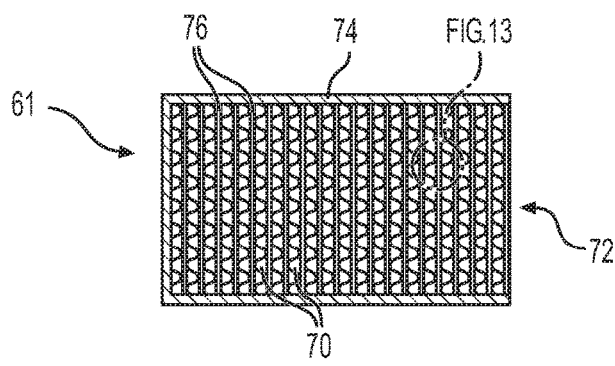
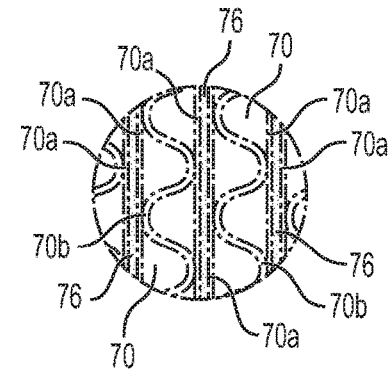
FIG. 12          FIG. 13
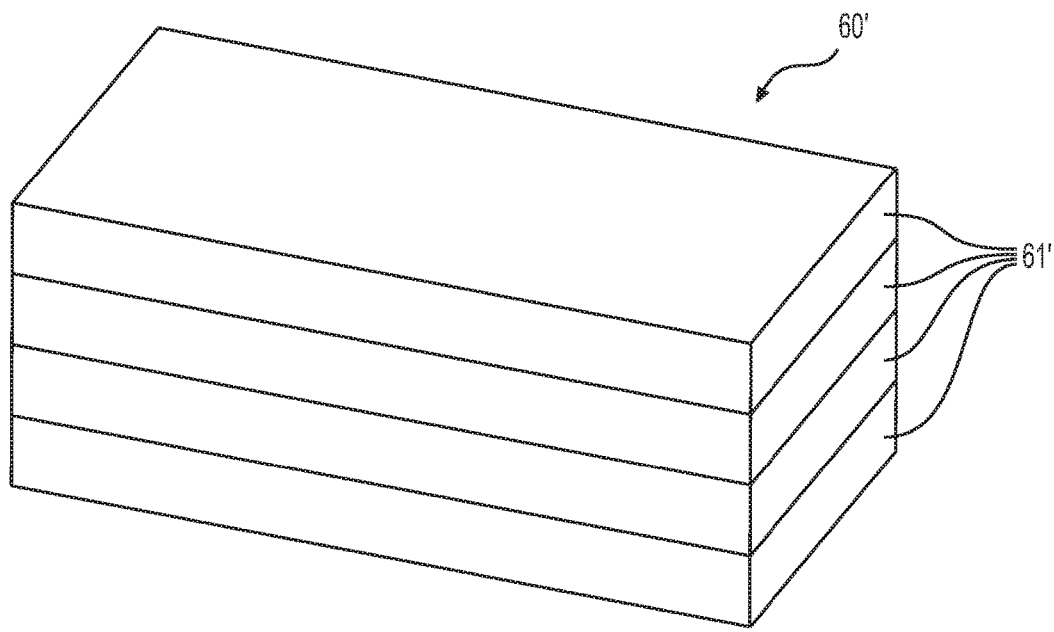
FIG. 14

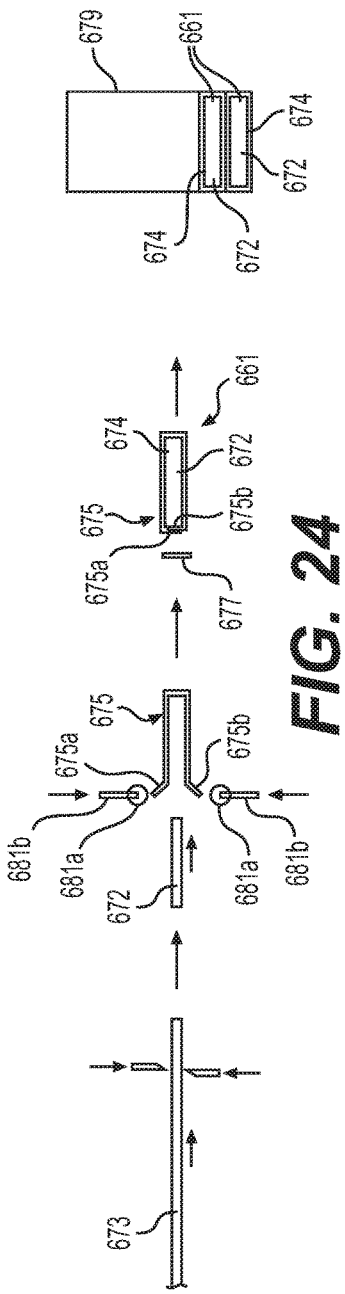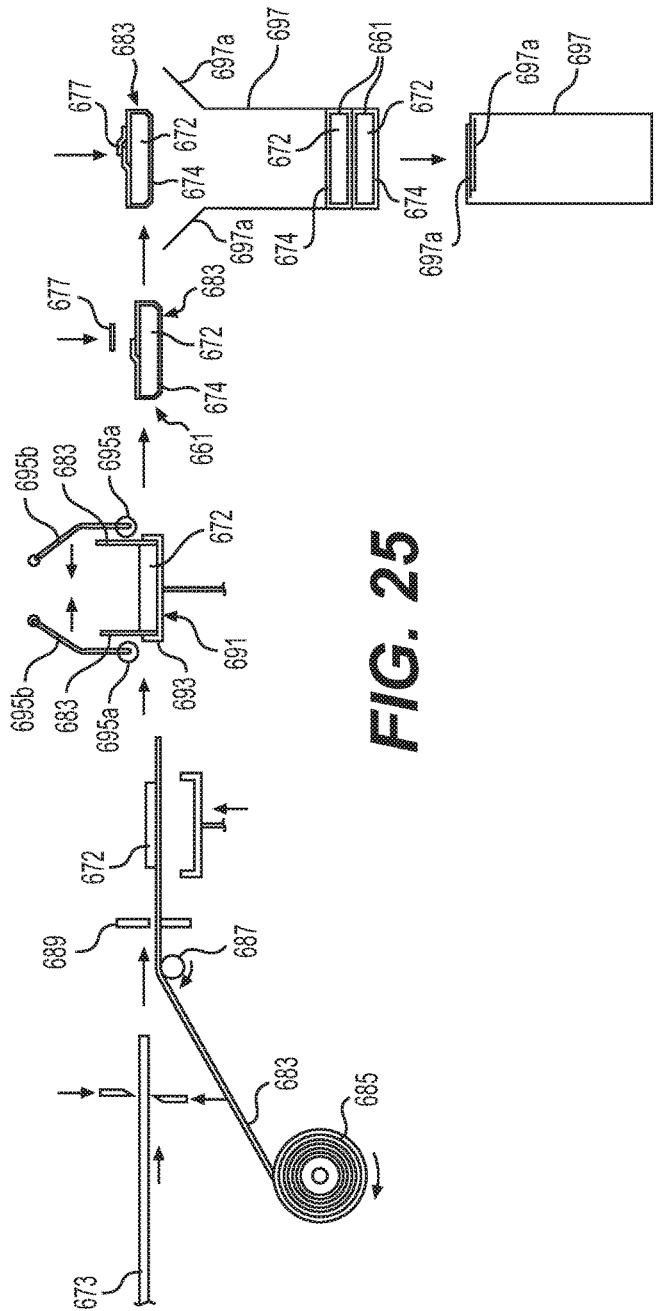

SUPPORT ASSEMBLY AND COMPONENTS

CROSS-REFERENCE TO RELATED APPLICATIONS

This is a continuation-in-part application of U.S. patent application entitled "SUPPORT ASSEMBLY AND COMPONENTS THEREOF", application Ser. No. 14/535,818, filed on Nov. 7, 2016 and U.S. patent application entitled "SUPPORT UNIT", application Ser. No. 14/613,472, filed on Feb. 4, 2015, which applications are incorporated by reference herein.

FIELD OF THE INVENTION

This invention relates to an assembly of components for supporting a weighty object such as a large metal pipe, and more particularly to such an assembly in which the components thereof are simple in design, formed of comparatively inexpensive materials, lightweight, easily fabricated, easily transportable and manually handled, capable of sustaining heavy loads and readily disposable after effective usage. In particular, this invention relates to a support assembly for constructing and staging a pipeline for installation in a trench. Further, this invention relates to support segments for use in the support assembly, methods of making the support segments, and method of constructing and staging a pipeline for installation in a trench.

BACKGROUND OF THE INVENTION

In the oil and natural gas industries, it is a common practice to transmit fluid commodities from one site to another. Such practice generally consists of forming a trench between such sites, providing and placing a transmission pipeline in such trench and filling such trench with excavated soil to permanently bury the pipeline. Typically, following the formation of the trench, segments or sections of the pipeline are transported to successive locations along and adjacent a trench line, mounted on skids or pallets in end-to end relation, welded together, transferred into the adjacent open trench, and covered with earth to provide a buried transmission pipeline.

In the prior art, such skids or pallets used to support pipeline segments have consisted of stacks of solid wooden beams. Typically, such beams have been formed and stored in warehouses or other storage sites distant from the pipeline routes, transported from distant storage sites to a location proximate a pipeline trench, repositioned by local machinery at spaced intervals along the opened trench, assembled at the sites onto skids or pallets for supporting the ends of successive sets of pipes to be welded together, disassembled upon welding, and loading the welded segments into the trench and either transported to a successive site along the pipeline route to be used again or transported to a local storage area or a distant storage facility for further usage as described.

Such practice of use of such skid or pallet components has been found to be uneconomical. Initially, it is to be noted that the components being formed of wood are expensive. The cost further is increased by the costs of storing, transporting to and from an assembly storage and use sites, handling at use sites, and discarding damaged or worn components. Accordingly, the principal object of the present invention is to provide a component for the purpose as described which is more economical to produce and use than predecessor components.

SUMMARY

The present invention overcomes and improves upon the shortcomings and deficiencies of the prior art by providing a support assembly for a weighty object such as a heavy metal pipeline segment, which includes a base tier including a pair of spaced beams; and at least one upper tier including a pair of spaced beams disposed angularly relative to and supported on a set of beams of a lower tier, wherein each of such beams is formed of a set of plies of corrugated cardboard secured together with a biodegradable adhesive, and such set of plies is coated with a biodegradable material. In the various embodiments of the invention, at least one additional beam may be provided in each tier of such assembly, the beams of each tier of such assembly are disposed at an angle, preferably a right angle to the beams of a successive tier of such assembly, such beams may be provided with two or three recesses on one or both upper and lower surfaces for receiving portions of a beam of a successive tier in locking engagement therewith and a beam in an uppermost tier may be provided in a center position with a depression for accommodating the placement and resting of an elongated member such as a pipeline segment.

In a still further embodiment of the invention, each tier of a stacked set of support components includes a rectangularly configured member formed of a set of plies of corrugated card board secured together with a biodegradable adhesive, coated with a biodegradable coating and or degradable coating, with those components intended for an upper tier being provided with an elongated recess having a curved cross-sectional configuration for receiving and resting a tubular member such as a pipeline segment.

The presently described subject matter is directed to a support assembly for construction and staging of a pipeline alongside a trench provided in ground prior to installation of the pipeline in the trench.

The presently described subject matter is directed to a support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment.

If desired the first support segment and second support segment are identical in size, shape, and construction.

The presently described subject matter is also directed to a support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment, wherein the first support segment and second support segment each comprise a core. If desired the core comprises one or more honeycomb fiber boards. Preferably, the honeycomb fiber boards are secured together with a biodegradable adhesive.

The presently described subject matter is also directed to the support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment, wherein the core comprises a set of plies of corrugated cardboard secured together with a biodegradable adhesive. Preferably, the core is enclosed within an outer covering. The outer covering may be made of a biodegradable material. The outer covering may be made of fiberboard. The outer covering may be a coating of biodegradable material.

The presently described subject matter is also directed to a support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment, wherein the support segments are shaped as rectangular prisms. Typically the support segments are shaped as rectangular prisms, wherein a height of the support segment is less than the length or width of the support segments. Further typically the support segments are shaped as rectangular prisms, wherein the support segments are stacked so that the second support segment completely overlaps the first support segment. Still further typically the support segments are stacked so that the second support segment completely overlaps the first support segment, wherein the support segments are oriented transverse relative to the pipeline.

The presently described subject matter is also directed to a support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment, wherein multiple stacks of support segments are spaced apart a distance relative to each other along a length of the pipeline.

Preferably in all embodiments of the invention at least a portion of each support segment is reinforced against crushing. Preferably least a portion of each support segment is reinforced against crushing, wherein the core of each support segment comprises one or more reinforcing blocks. Typically at least a portion of each support segment is reinforced against crushing, wherein the core of each support segment comprises one or more reinforcing blocks, wherein edges along a width of the support segments are reinforced with the reinforcing blocks. More typically at least a portion of each support segment is reinforced against crushing, wherein the core of each support segment comprises one or more reinforcing blocks, and wherein the core comprises two spaced apart reinforcing blocks together centered within each support segment to prevent the pipeline from rolling after being centered on top of the stack of the support segments.

The presently described subject matter is also directed to a support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment, wherein each support segment is configured to prevent the pipeline from rolling off each support segment after being centered on top of the second support segment. For example, each support segment is configured to prevent the pipeline from rolling off each support segment after being centered on top of the second support segment, and the second support segment is provided with a centered notch. For example, each support segment is configured to prevent the pipeline from rolling off each support segment after being centered on top of the second support segment, and a center portion of the core is less thick relative to end portions of the core. Or for example, each support segment is configured to prevent the pipeline from rolling off each support segment after being centered on top of the second support segment, and a pair of spaced apart support blocks together are centered in the core.

The presently described subject matter is preferably directed to a support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment, wherein each support segment is configured to prevent the pipeline from rolling off each support segment after being centered on top of the second support segment, and wherein the second support segment is configured to be crushed downwardly in height at a center portion of the second support segment when the pipeline is positioned and supported on top of the second support segment.

The presently described subject matter is also directed to a support segment for constructing a support assembly for construction and staging of a pipeline alongside a trench provided in ground prior to installation of the pipeline in the trench, the support segment comprising or consisting of: a biodegradable core comprising one or more honeycomb fiber boards, the one or more honeycomb fiber boards comprising outer linerboard spaced apart by a center honeycomb layer; and an outer covering enclosing the core. If desired the outer covering is biodegradable. If desired the outer covering is removable and recyclable.

The presently described subject matter is also directed to a method of constructing and staging a pipeline alongside of an in ground trench, the method comprising or consisting of: assembling spaced apart stacks of rectangular prism shaped support segments alongside the trench; placing sections of pipe on top of the stacks of support segments; centering the sections of pipe on top of the stacks of support segments; orienting the support segments transverse relative to the sections of pipe; welding the sections of pipe together to construct a pipeline supported on top of the stacks of support segments.

The presently described subject matter is also directed to a method of making a support segment for use in constructing and staging a pipeline alongside of an in ground trench, the method comprising or consisting of: cutting a sheet of biodegradable materials into individual cores; inserting the individual cores each into boxes defining outer coverings of the support segments; closing each box to enclose each core; and sealing each box closed.

The presently described subject matter is also directed to a support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment, wherein the first support segment and second support segment each comprise a core, and wherein the honeycomb fiber boards are secured together with a biodegradable adhesive, wherein the biodegradable adhesive comprises one of a group consisting of Dextrin, starched based glues, Casein glues or Mucilage.

The presently described subject matter is directed to a support assembly for construction and staging of a pipeline alongside a trench provided in ground prior to installation of the pipeline in the trench, the support assembly comprising or consisting of a first support segment placed in contact with the ground; a second support segment stacked on top of the first support segment; and the pipeline supported on top of the second support segment, wherein the core comprises a set of plies of corrugated cardboard secured together with a biodegradable adhesive, wherein the core is enclosed within an outer covering, wherein the outer covering is a coating of biodegradable material, wherein said biodegradable coating comprises one of a group consisting of natural rubber, latex, India rubber, polyisoprene, polymers of isoprene, polyisoprene elastomers, polymer cis-1, 4-polyisoprene, 2-octylcyanoacrylate, cyanoacrylate esters and vinyl identified by CAS numbers by the chemical abstracts Service, a division of the American Chemical Society.

The support assembly and support segment(s) shown and described herein can be used for a variety of purposes. For example, the support assembly can be used for constructing and staging a pipeline on-site at the location of installation. For example, the support assembly can comprise stacks of support segments for temporary supporting pipe segments or sections above the ground to allow same to be welded together to construct a pipeline.

As an example, support stacks are transported from a storage or supply location and delivered on-site, and then assembled into spaced apart stacks of support segments located adjacent to a trench to be dug, or existing. The pipe segments or sections are transported from a storage or supply location and delivered on-site and located adjacent to the trench to be dug, or existing. The pipe segments or sections are then lifted off the ground and placed abutting end-to-end on top of the assembled stacks of support segments to define the support assembly supporting the still disconnected pipe segments or sections above the ground in a stable manner. The pipe segments or sections are then welded together to construct and stage the pipeline readied for installation in the adjacent trench. The pipeline is pressure tested, and then gently lifted off the support segments to remove same, and the moved and lower the constructed pipeline into position within the trench. Optionally, spaced apart support segments (e.g. single support segments or stacks of support segments) can be placed in the bottom of the trench for supporting the constructed pipeline in the trench, for example, to accommodate any variation in the contour and/or grade within the bottom of the trench. For example, this supporting of the constructed pipeline within the trench prevents stress risers on sections of the constructed pipeline to prevent breakage, for example, during burying the pipeline or after installation (e.g. months to years later after the installation). These support segments located in the trench can be buried along with the pipeline, or removed and disposed of as the pipeline is being buried using gravel or other support fill to replace the support segments.

The support assembly comprises or consists of the support segments. For example, the support segments are assembled into spaced apart stacks supported on the ground. The number of support segments in each stack is dictated by the contour and grade of the ground adjacent to the ditch to be constructed, or existing. Further, the number of support segments is dictated by a desired height to support the pipe segments or sections above the ground to enable the most desirable height above the ground for workers or machines to weld the joints for joining ends of adjacent pipe segments or sections together.

The support segments can have a variety of shapes (e.g. rectangular prism, square prism, pyramid with top portion removed to make top flat, round cylinder). For example, a particularly useful shape for the support segments is a rectangular prism having a length longer than its width, and a thickness less than the width. This arrangement provided a support segment that is very stable when stacked one on top of the other, and significantly facilitates the inexpensive manufacture thereof.

The support segment, for example, can comprise or consist of an inner core and an outer covering. The inner core can be continuous, or discontinuous in configuration or structure. For example, the inner core can be made of a homogenous material formed into a rectangular prism. For example, the inner core is cut, molded, extruded, and/or machined to have a rectangular prism shape. Alternatively, a sheet or sheets of material are cut into individual cores. For example, multiple plies are assembled together (e.g. adhered together side-by-side, adhered layer on top of layer, molded together (e.g. insert molded), taped or banded together, and/or otherwise mechanically fastened together to make an integral core structure).

The core of the support segment can be formed or constructed to have voids or cavities, and made up of same or different material subcomponents assembled together (e.g. composite construction). For example, the support segment can comprise or consist of honeycomb board (e.g. honey comb fiber board constructed of a pair of liner board spaced apart by a honeycomb layer). Further, the core can be constructed to have reinforcing components and/or materials to tailor the strength of the core in various manners or modes. For example, the core is provided with one or more stiffening blocks selected to prevent crushing or stronger in compression. The stiffening blocks, for example, can be made of wood, plastic, foam, hard foam. For example, the stiffening blocks can be provided at or adjacent to one or more edges of the support segment to avoid crushing of the edge thereof. Further, the stiffening blocks can be used to maintain a pipe segment or section centered on top of the support segment to prevent same from rolling off, for example, a stack of support segments. In this manner, for example, a center portion of the top support segments is compressed or crushed downwardly while adjacently place stiffening blocks maintain the full thickness of the support segments adjacent to the center thereof, thus effectively capturing the pipe segment or section.

BRIEF DESCRIPTION OF THE DRAWINGS

FIG. 12 is a vertical partial longitudinal cross-sectional detail view of the core of the support segment shown in FIG. 10.

FIG. 13 is a partial exploded detailed view showing the detailed construction or arrangement of the core of the support segment shown in FIG. 12.

FIG. 14 is a perspective view showing a stack of the various support segments shown in FIG. 10, 16-18, or 20-22.

FIG. 24 is a diagrammatic view showing the making of a support segment.

FIG. 25 is a diagrammatic view showing the making of another support segment.

DETAILED DESCRIPTION

Figure 1:
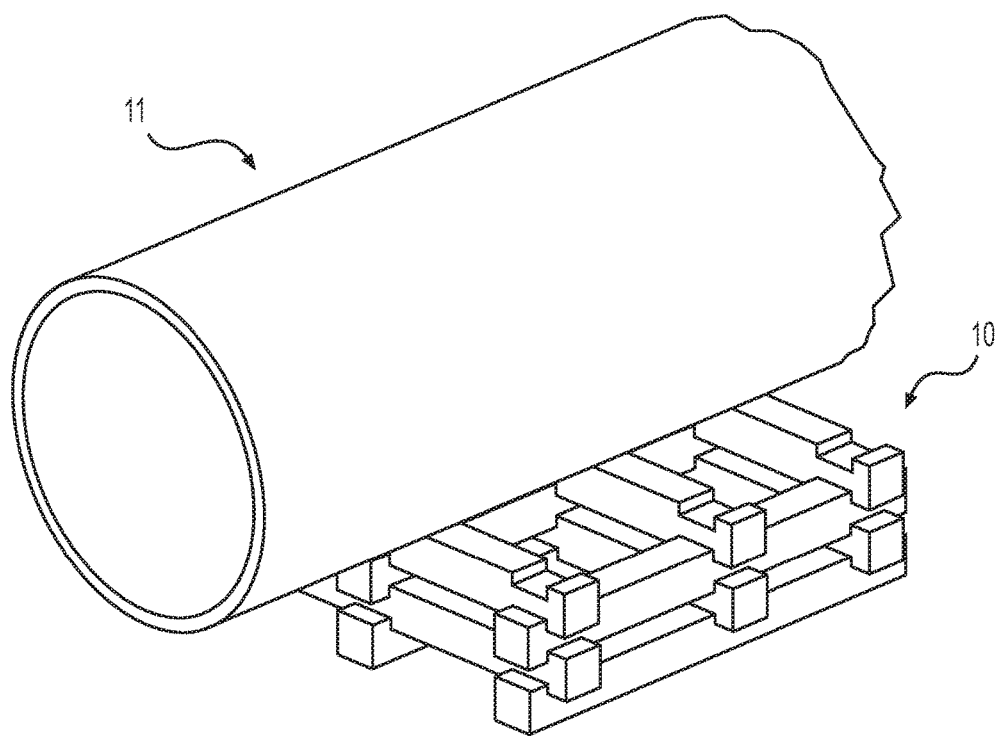
FIG. 1 is a perspective view of a first embodiment of the invention consisting of an assembly functional to support a portion of a large pipe segment.
Figure 2:
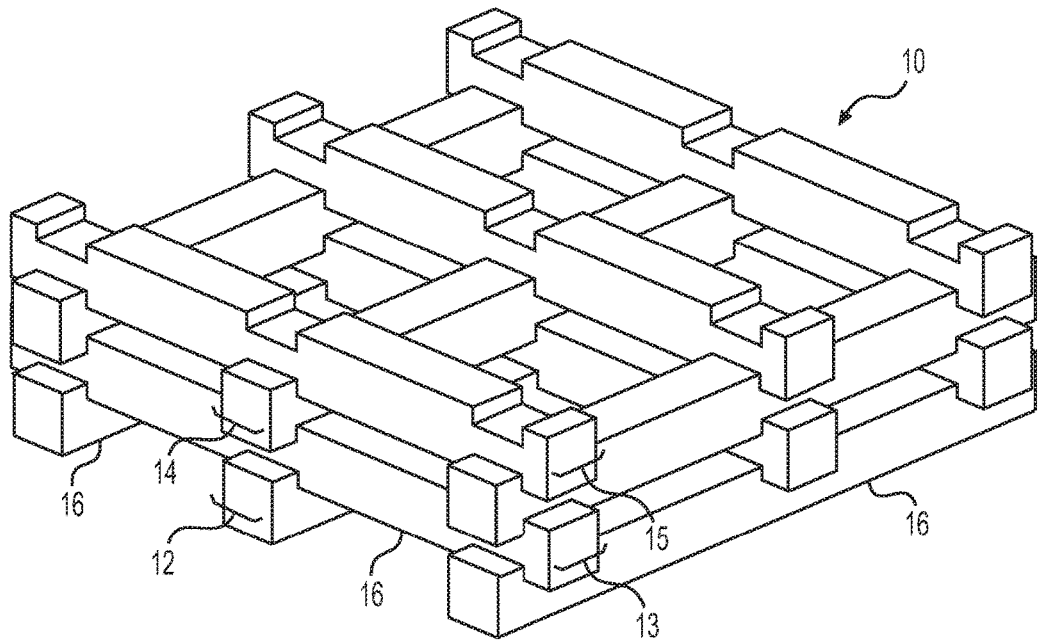
FIG. 2 is a clear perspective view of the assembly shown in FIG. 1 supporting a pipe segment.
Figure 4:
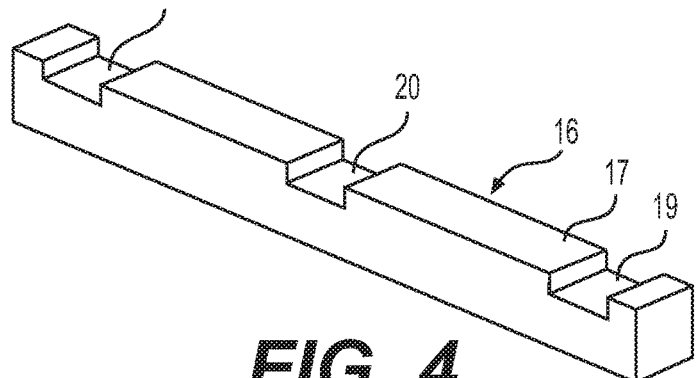
FIG. 4 is a perspective view of a component beam utilized in forming the support assembly shown in FIGS. 1 and 2 or 3.

Referring to FIGS. 1 and 2 of the drawings, there is shown a first embodiment of the invention including a support assembly 10 supporting a portion of a pipeline segment 11, providing a base tier 12 and a set of upper tiers 13, 14 and 15, each provided with a set of beams 16, as shown in FIG. 4. As best shown in FIG. 4, each beam 16 is generally shaped as a rectangular prism configured with an elongated rectangular surface 17 provided with a pair of spaced recesses 18 and 19 disposed adjacent the ends thereof and a centrally disposed recess 20 between recesses 18 and 19. Base tier 12 of assembly 10 includes a set of three (3) parallel, spaced apart beams 16 with the recesses 18, 19 and 20 of each of the beams aligned with comparable recesses in each of the other two beams of the tier. Each of the upper tiers 13, 14 and 15 includes a set of three parallel, spaced beams 16, with the recesses 18, 19 and 20 of each of the beams aligned with comparable recesses in each of the other two beams of the tier, with each of the beams being disposed at a right angle relative to a beam in a lower tier and received in and seated in an aligned set of recesses in a set of beams of a lower tier.

Figure 5:
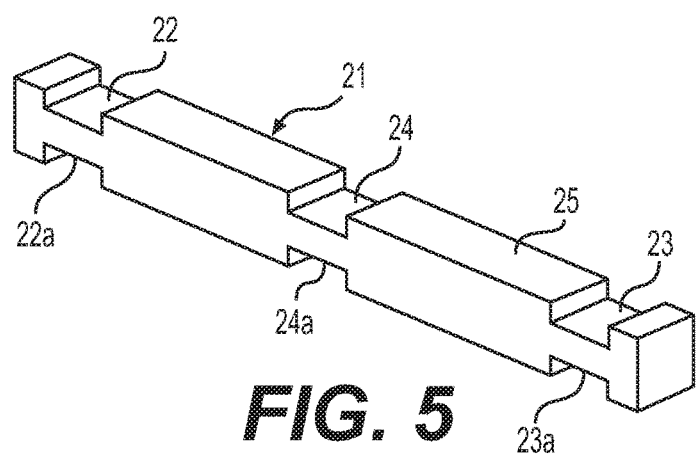
FIG. 5 is a perspective view an alternate component beam that may be utilized in forming a support assembly as shown in FIGS. 1 and 2 or 3.

In lieu of a set of beams, as shown in FIG. 4, in forming an assembly as shown in FIGS. 1 and 2, a beam 21 shown in FIG. 5 may be used. Such beam is provided with a first set of recesses 22, 23 and 24 in an upper surface 25, comparable to recesses 18, 19 and 20 of beam 16, and a second set of recesses 22a, 23a and 24a in an opposite surface, comparable and aligned, respectively, with recesses 22, 23 and 24 in the upper surface thereof. A plurality of beams 21 may be assembled together as described with respect to beam 16 to form an assembly similar to that shown in FIG. 3. In such modified assembly, the recesses on the underside of beams 21 are aligned to receive portions of the beams in upper and/or lower beams to provide a greater rigidity to the assembly.

Figure 3:
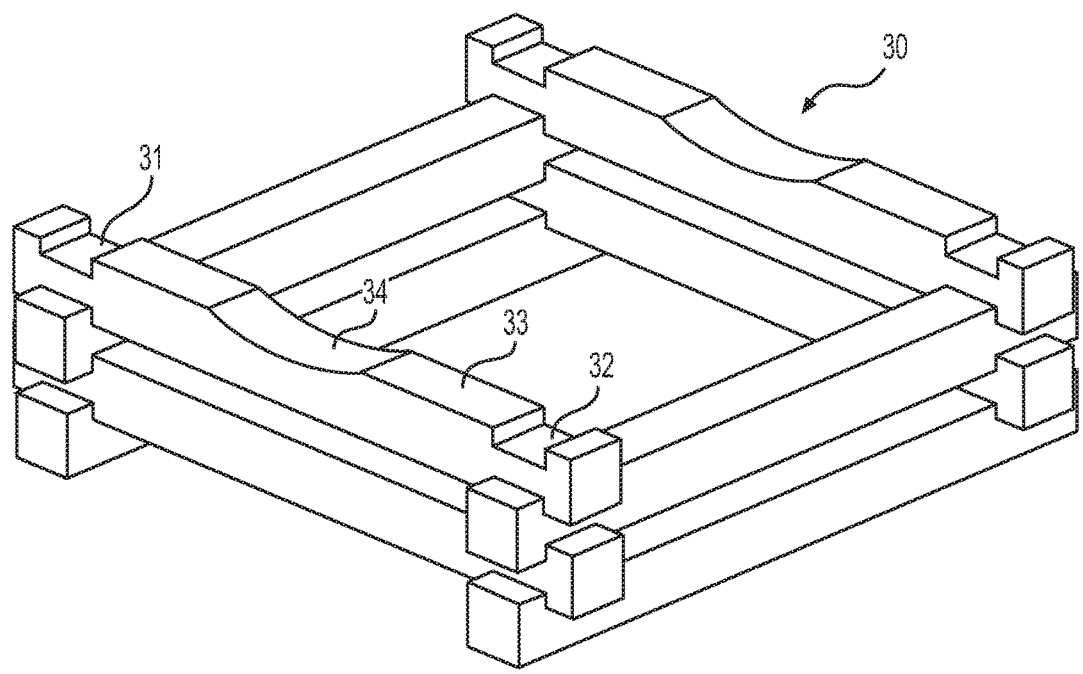
FIG. 3 is a perspective view of another embodiment of the present invention similarly functional to support a portion of a large pipe segment as shown in FIG. 1.
Figure 6:
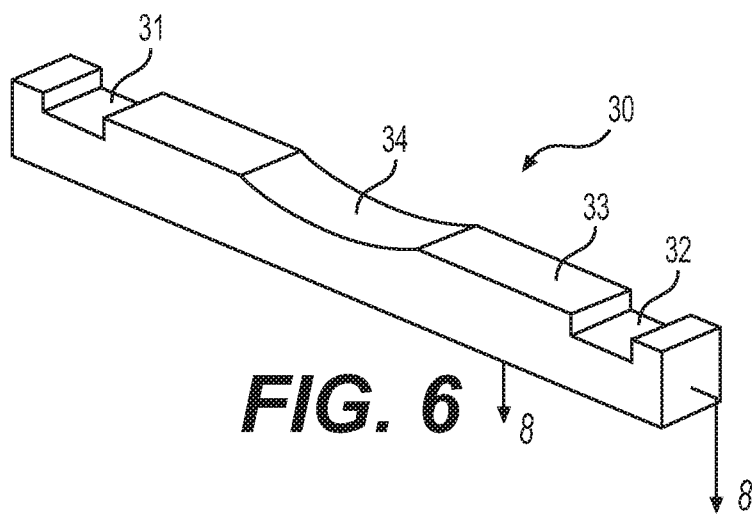
FIG. 6 is a perspective view of a component beam utilized in forming the support assembly shown in FIG. 3.
Figure 7:
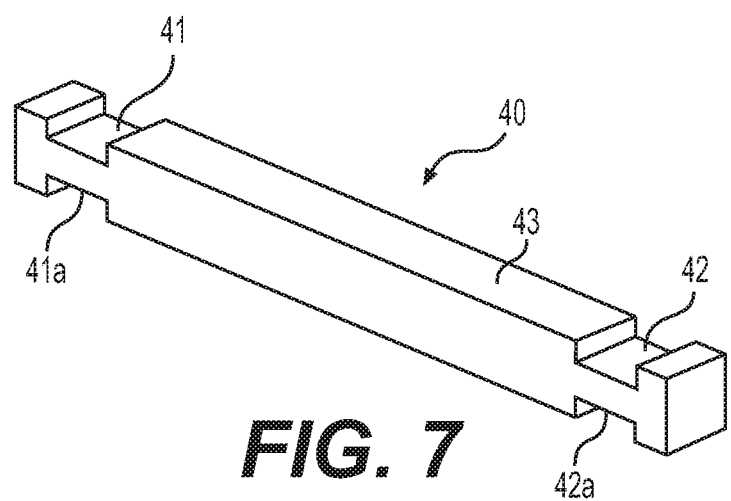
FIG. 7 is a perspective view of an alternate component beam that may be utilized in forming the a support assembly shown in FIG. 3.

Referring to FIG. 3 of the drawings, there is disclosed a perspective view of another support assembly of a further embodiment of the invention. This support assembly uses only two beams per tier. The beams include a configuration as provided in a beam 30 shown in FIG. 6, and a configuration as provided in a beam 40, as shown in FIG. 7. Beam 30 is configured similarly to the configuration of beam 16 shown in FIG. 4 including a pair of spaced recesses 31 and 32 in a surface 33, with a curved, shallow depression 34 centered between recesses 31 and 32 in lieu of a recess as provided in beam 16. Beam 40 is configured similarly to the configuration of either beam 16 or 21, omitting any centered recess or depression and providing a spaced set of recesses 41a and 42a in an opposite surface, each aligned with a recess 41 or 42, respectively. Beams 30 and 40 may be assembled in a manner as described with respect to beams 20 and 21 to form an assembly, as shown in FIG. 3, with two (2) spaced beams in each tier. The beams of each upper tier being disposed at right angles to the beams of a successive tier and either of the beams being provided in the uppermost tier with the uppermost beams preferably consisting of beam 30 with the depressions 34 being aligned to provide a resting surface for a portion of a pipeline segment.

Figure 8:
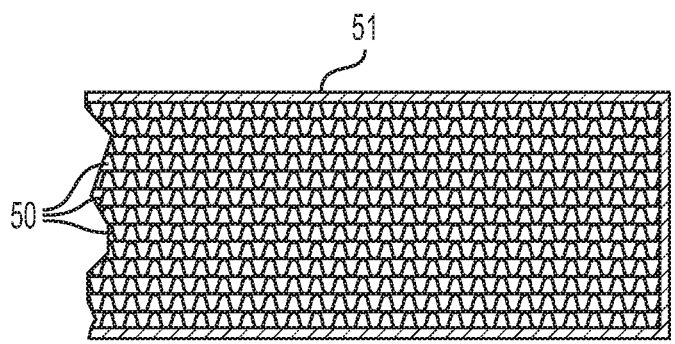
FIG. 8 is an enlarged sectional view taken along lines 8-8 in FIG. 6, illustrating the composition of the internal structure of the beam shown in FIG. 6 and comparable to the compositions of the structure of each of the component beams utilized in any of the disclosed beam assemblies.

Referring to FIG. 8, each of the beams described is formed of a plurality of plies 50 of corrugated cardboard, secured together with a biodegradable adhesive and coated with a biodegradable material providing a durable casing. The adhesive may consist of Dextrin, starched based glues, Casein glues or Mucilage. The coating may consist of natural rubber, latex, India rubber, polyisoprene, polymers of isoprene, polyisoprene elastomers, polymer cis-1, 4-polyisoprene, 2-octylcyanoacrylate, cyanoacrylate esters or vinyl identified by CAS numbers by the Chemical Abstracts Service, a division of the American Chemical Society.

In the use of the beams as described, they may be initially stored at an offsite location, manually loaded on vehicles and transported to selected use sites, manually unloaded and stacked at such selected use sites, manually transferred to selected sites along a pipeline route and assembled as described for mounting a pipeline segment, disassembled after removal of the pipeline segment possibly shredded and disposed of either by burial or other means upon ineffectiveness or deterioration in use. Such construction, handling and disposition of such beams provides not only for a minimal cost of production of such beams but in a facilitation and low cost of usage thereof. The fabrication of such beams provides a low cost, the reduced weight thereof permits manual handling thereof and the disposal aspect thereof eliminates further handling and transportation thereof, substantially reducing the cost in the use of such beams.

Figure 9:
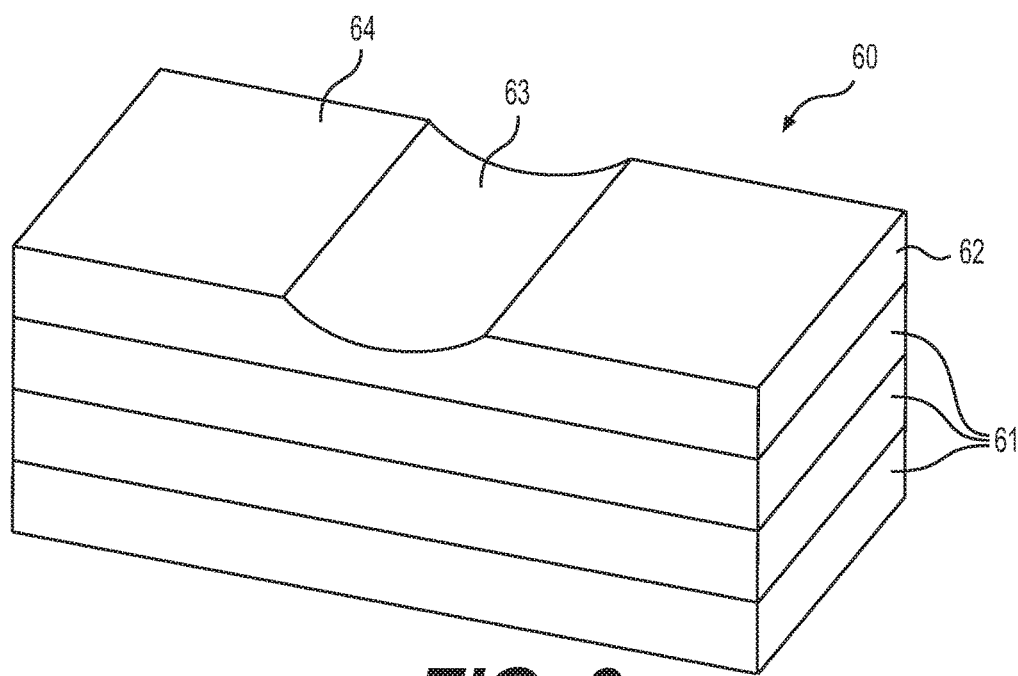
FIG. 9 is a perspective view of another embodiment of the invention consisting of another assembly functional to support a portion of a large pipeline segment.
Figure 10:
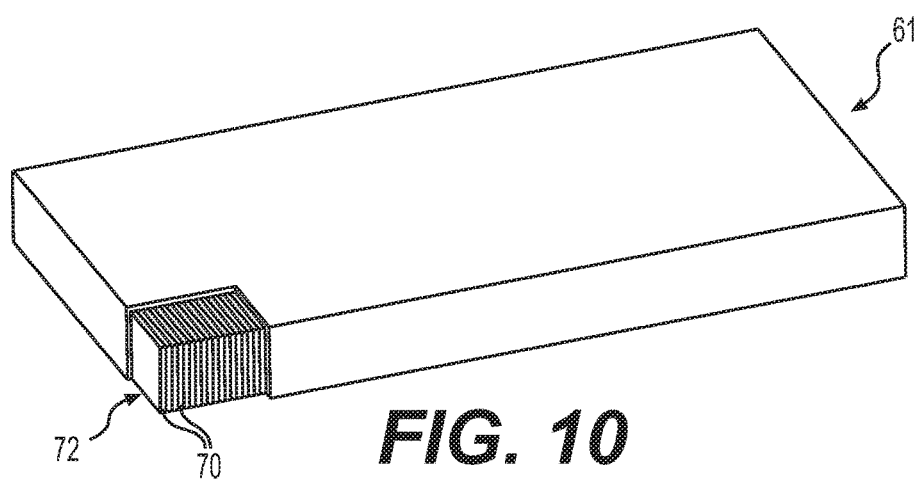
FIG. 10 is a perspective view of a component utilized in forming a tier of the assembly shown in FIG. 9.
Figure 11:
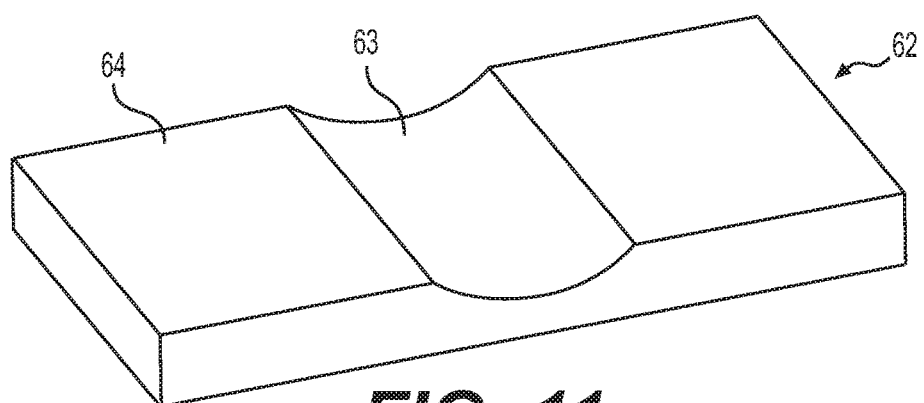
FIG. 11 is a perspective view of a component similar to the component shown in FIG. 10, provided with an elongated recess having a curved cross sectional configuration which may be provided in an upper tier of an assembly as shown in FIG. 9 to receive and support a portion of a pipeline segment.

Referring to FIGS. 9 through 11 of the drawings, there is shown another embodiment of the invention as a further support assembly 60 comprising a stack of one or more lower tier support segments 61 each configured, as shown in FIG. 10, and an upper tier segment 62 configured, as shown in FIG. 11. Each lower tier segment 61 is shaped as a rectangular prism configured, preferably measuring 30 inches wide, 48 inches long and 6 inches thick, formed of a biodegradable material. It includes a set of plies of corrugated cardboard adhesively secured together, coated about the periphery thereof. Such adhesive and coating materials are similar to those used with respect to the previously described embodiments of the invention above.

Each upper tier segment 62 is configured and constructed similarly to segment 61 in terms of width, length, thickness and internal construction, and further is provided with a curved recess 63 in a planar surface 64 thereof, extending from one long edge thereof to an opposed edge thereof. Such recess is positioned and configured for effectively receiving and supporting a portion of a pipeline segment, when mounted on a stack of lower tier segments 61 as shown in FIG. 9. As partially shown in FIG. 10, the internal construction of each segment 61 and 62 is similar to the internal construction of each of the components of the previously described embodiments as shown in FIG. 8. The support segments 61 and 62 are usable similarly to the use of the beam members provided in the aforementioned embodiments, are intended to be stacked and stored at an off-site location, transported to one or more sites along a pipeline trench and manually unloaded, and then manually hauled to spaced sites along and adjacent the trench where they are stacked to provide a support for end portions of pipes to be welded together. Each of such stacks would consist of a selected number of lower tier support segments 61 and an upper tier segment 62 positioned on the uppermost segment 61 with the length of recess 63 therein disposed substantially parallel to the trench.

Referring to FIG. 12 of the drawings, each of the support segments 61 and 62 can be formed of a plurality of plies 70 of corrugated cardboard, secured together with one or more adhesives (e.g. biodegradable adhesive) to form a core 72. The core 72 is at least partially enclosed (e.g. one or more exposed portions or encapsulated) with an outer covering 74. For example, the outer covering 74 can be a coating, laminate, wrap, molded layer, or combination thereof. The material (e.g. biodegradable material) of the outer covering 74, for example, can be selected to provide a durable outer covering 74 while also being biodegradable.

The adhesive, for example, can be applied to provide adhesive layers 76 located between adjacent plies 70, as shown in detail in FIG. 13. Specifically, each ply 70 comprises a pair of sheets 70a sandwiching a corrugated layer 70b.

The adhesive for adhering the plies 70 together can be Dexatrin, starched based glues, Casein glues or Mucilage. The coating can comprise or consist of natural rubber, latex, India rubber, polyisoprene, polymers of isoprene, polyisoprene elastomers, polymer cis-1, 4-polyisoprene, 2-octyl-cyanoacrylate, cyanoacrylate esters or vinyl identified by CAS numbers by the Chemical Abstracts Service, a division of the American Chemical Society.

The assembly 60' shown in FIG. 14 comprises multiple (e.g. three (3)) segments 61' stacked one on top of the other. The segments 61' can be stacked free standing (i.e. without any connection therebetween), or can be stacked and connected together using adhesive between segments 61', using double sided tape between segments 61', using tape on one or more edges of the segments 61', and/or using a mechanical fastener (e.g. one or more metal stakes, one or more metal or nylon bands wrapping around assembly 60', one or more clamps, etc.).

Figure 15:
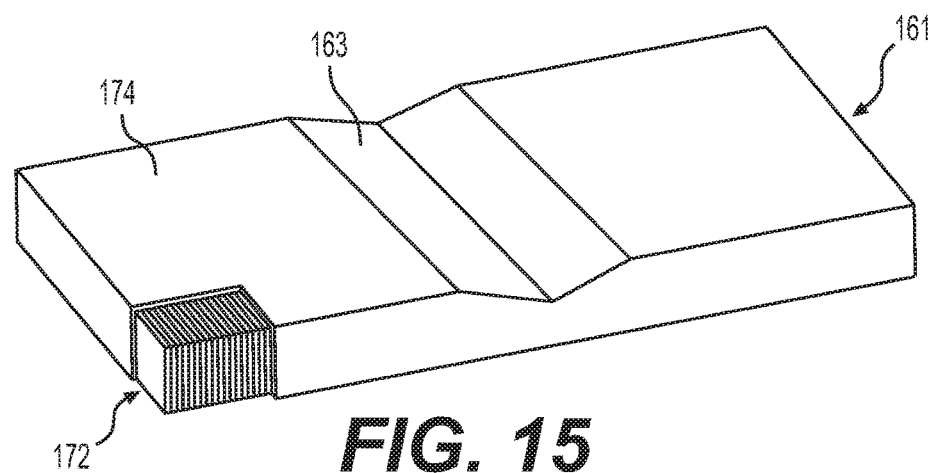
FIG. 15 is a perspective view of another support segment.

Another segment 161 comprising a core 172 and a covering 174 is shown in FIG. 15. This segment 161 includes an upside down triangular-shaped recess 163 configured to prevent a pipe from rolling off center therefrom when supporting the pipe for welding or staging.

The core 172 can be made of multiple plies adhered together like segment 61 shown in FIG. 13. Alternatively, the core 172 can be made of one or more honeycomb panels such as manufactured by Packaging Corporation of America (PCA), 1955 West Field Court, Lake Forest, Ill. 60045 (800-456-4725) or HEXACOMB panels manufactured by Hexacomb Corporation, 1650 Lake Cook Road, Suite 400, Deerfield, Ill. 60015 (800-323-9161).

The outer covering 174 can be a coating, laminate, panel, wrap (e.g. Tyvek), shrink wrap, or other suitable covering material (e.g. biodegradable) applied to the core 172. For example, the outer covering 174 is a fiberboard wrap applied to the core 172.

The flat linerboard(s) of the fiberboard can be coated to be waterproof on at least the outside or both outside and inside surfaces. Alternatively, the outer covering 174 can be wrapped with biodegradable sheet material and taped, shrink wrapped, or vacuum sealed.

Figure 16:
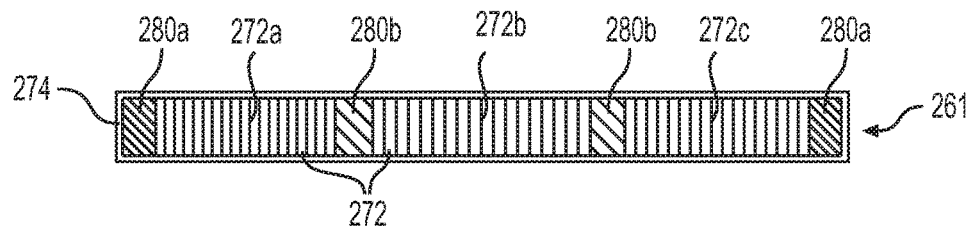
FIG. 16 is a vertical longitudinal view of a further support segment.
Figure 17:
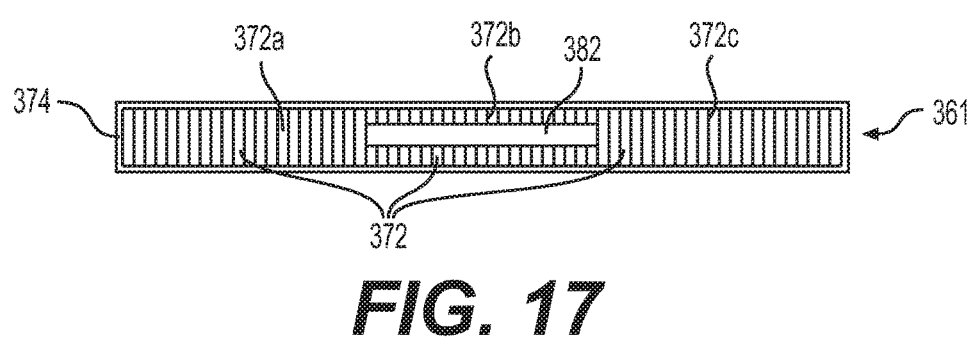
FIG. 17 is a vertical longitudinal view of an even further support segment.

A further segment 261 is shown in FIG. 16. The segment 261 comprises blocks 280a, 280b spaced apart by three (3) separate cores 272a, 272b, 272c, which can be made of the same or different core materials or panels and assembled together (e.g. adhered together). The blocks 280a, 280b, for example, can be made of wood, hard foam blocks, plastic or composite blocks, hard plastic honeycomb blocks, or other suitable block material and configuration to resist compression. The inner blocks 280b are located inside the segment 261, and capture and maintain the pipe centered on top of the segment 61 to prevent the pipe from rolling off therefrom. The blocks 280a are located adjacent to the ends of the segment 261, and prevent the ends of the segment 261 from compressing or crushing to maintain the stability of a stack of these segments 261. The outer covering 274 can be a coating, laminate, panel, wrap (e.g. Tyvek), shrink wrap, or other suitable covering material (e.g. biodegradable) applied to the assembled core Another further segment 361 is shown in FIG. 17. The segment 361 comprises three (3) separate cores 372a, 372b, 372c assembled together (e.g. adhered together). Alternatively, the core 372 is a single core. A cavity 382 is provided in the core 272b, and configured to collapse or compress when a pipe is centered on top of the segment 361. For example, the cavity 382 can be made before or after assembly of the core 372b (e.g. core 372b is assembled, formed, or machined to provide the cavity 382).

Figure 18:
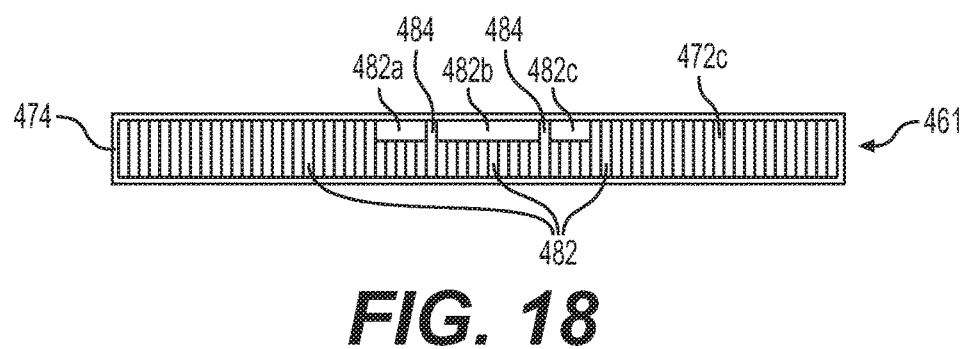
FIG. 18 is a vertical longitudinal view of another further support segment.

An even further segment 462 is shown in FIG. 18. The segment 461 comprises three (3) separate cores 472a, 472b, 472c assembled together (e.g. adhered together). Alternatively, the core 472 is a single core. Cavities 482a, 482b, 482c are provided in the core 472b, and configured to collapse or compress when a pipe is centered on top of the segment 461. For example, the cavities 482a, 482b, 482c can be made before or after assembly of the core 472b (e.g. core 472b is assembled, formed, or machined to provide the cavity 482). The core 472b includes supports 484 provided to support the outer covering 474 located above the cavities 482a, 482b, 482c from deforming (e.g. bowing) down into the cavities 482a, 482b, 482c during storage or use.

Figure 19:
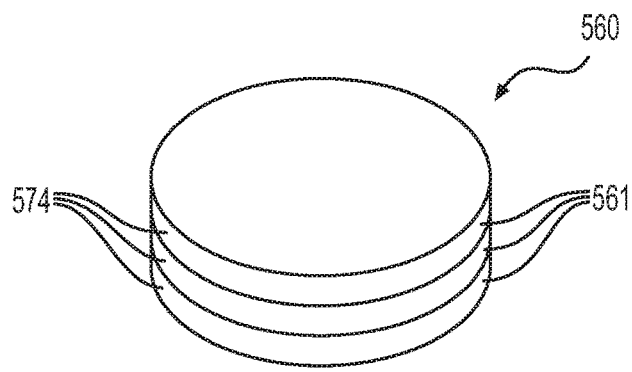
FIG. 19 is a perspective view of a stack of round support segments.

The segments shown and described above have the shape of a rectangular cuboid. However, the segments can have other different shapes such as a cube, parallelepiped, cylinder, pyramid, or other suitable shape and configuration. For example, the assembly 560 comprises three (3) circular-shaped segments 561 stacked on top of each other, as shown in FIG. 19.

The outer covering 574 can be a coating, laminate, panel, wrap (e.g. Tyvek), shrink wrap, or other suitable covering material (e.g. biodegradable) applied to the core 572. For example, the outer covering 574 is a fiberboard wrap applied to the core 572.

Figure 20:
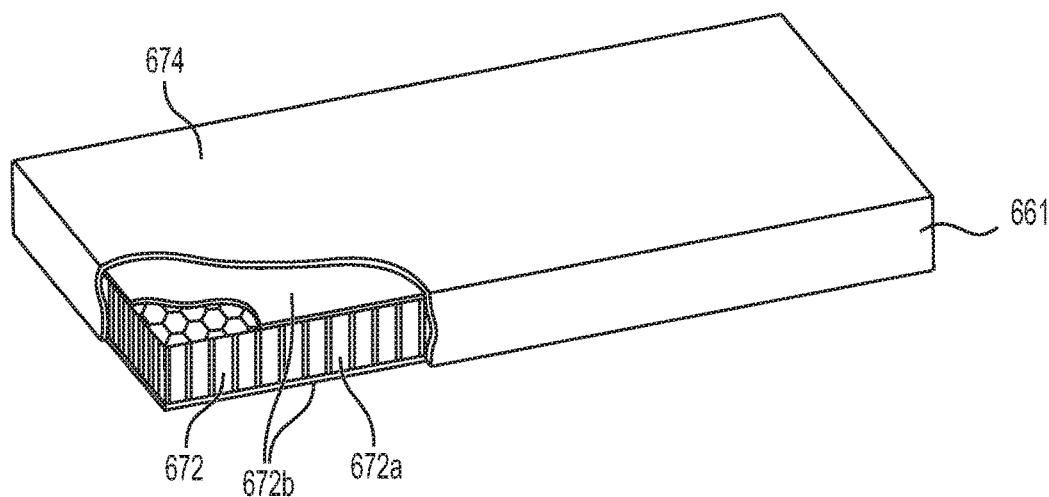
FIG. 20 is a partial broken away perspective view of another support segment.

Another segment 661 is shown in FIG. 20. The segment 661 comprises a single core 662 made of a honeycomb panel such as manufactured by Packaging Corporation of America (PCA), 1955 West Field Court, Lake Forest, Ill. 60045 (800-456-4725) or HEXACOMB panels manufactured by Hexacomb Corporation, 1650 Lake Cook Road, Suite 400, Deerfield, Ill. 60015 (800-323-9161). The core 672 comprises a honeycomb layer 672a disposed between liner boards 672b The outer covering 674 can be a coating, laminate, panel, wrap (e.g. Tyvek), shrink wrap, or other suitable covering material (e.g. biodegradable) applied to the core 672. For example, the outer covering 674 is a fiberboard wrap applied to the core 672.

Figure 21:
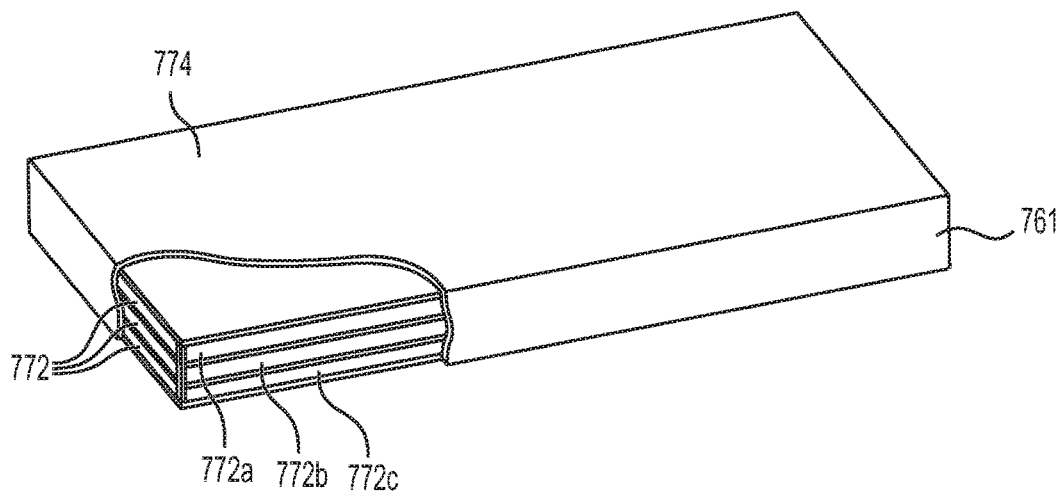
FIG. 21 is a partial broken away perspective view of a further support segment.

Another segment 761 is shown in FIG. 21. The segment 761 comprises a core 762 made of multiple (e.g. three (3)) honeycomb panels 762a, 762b, 762c such as manufactured by Packaging Corporation of America (PCA), 1955 West Field Court, Lake Forest, Ill. 60045 (800-456-4725) or HEXACOMB panels manufactured by Hexacomb Corporation, 1650 Lake Cook Road, Suite 400, Deerfield, Ill. 60015 (800-323-9161). The panels 762a, 762b, 762c can be unattached, or connected together (e.g. by adhesive, mechanical fastener, tape, band(s), wrapped, etc.).

The outer covering 774 can be a coating, laminate, panel, wrap (e.g. Tyvek), shrink wrap, or other suitable covering material (e.g. biodegradable) applied to the core 772. For example, the outer covering 774 is a fiberboard wrap applied to the core 772.

Figure 22:
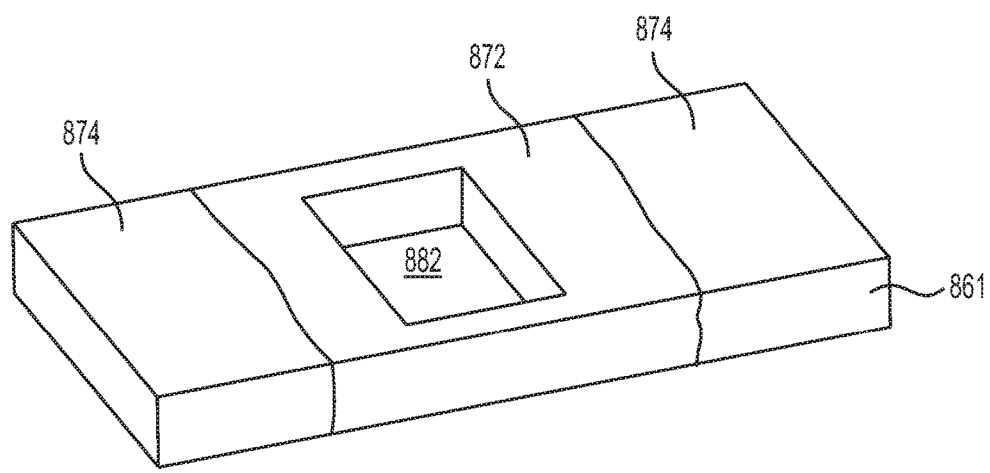
FIG. 22 is a partial broken away perspective view of an even further support segment.

A further segment 861 is shown in FIG. 22. The segment 861 comprises a core 862 made of single or multiple (e.g. three (3)) honeycomb panel(s) 862 such as manufactured by Packaging Corporation of America (PCA), 1955 West Field Court, Lake Forest, Ill. 60045 (800-456-4725) or HEXACOMB panels manufactured by Hexacomb Corporation, 1650 Lake Cook Road, Suite 400, Deerfield, Ill. 60015 (800-323-9161). The panel(s) 862 can be unattached, or connected together (e.g. by adhesive, mechanical fastener, tape, band(s), wrapped, etc.).

The core 872 is provided with a cavity 882 (e.g. rectangular-shaped, square-shaped) as shown in FIG. 22. The cavity 882 is configured to collapse when a pipe is centered on top of the segment 861 to prevent the pipe from rolling off therefrom.

The outer covering 874 can be a coating, laminate, panel, wrap (e.g. Tyvek), shrink wrap, or other suitable covering material (e.g. biodegradable) applied to the core 872. For example, the outer covering 874 is a fiberboard wrap applied to the core 872.

Method of Using

Figure 23:
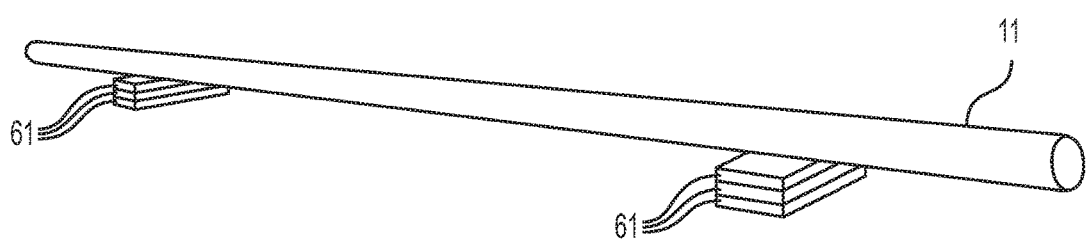
FIG. 23 is a perspective view showing the support assembly for constructing and staging a pipeline.

The support segments 61 and 62 are usable similarly to the use of the beam members provided in the aforementioned embodiments, they are intended to be stacked and stored at an off-site location, transported to one or more sites along a pipeline trench, manually unloaded, and then manually hauled to spaced sites along and adjacent the trench where they are stacked to provide a support for end portions of pipes to be welded together. For example, each of the stacks would include a selected number of segments 61, as shown in FIG. 23, stacked one on top of the other, and oriented transverse relative to the pipe 11. Alternatively, Each of such stacks would consist of a selected number of lower tier support segments 61 and an upper tier segment 62 positioned on the uppermost segment 61 with the length of recess 63 therein disposed substantially parallel to the trench. In this embodiment the top segment 61 of each stack can be replaced with the segment 62 having the curved recess 63 to accommodate the pipe and prevent the pipe from rolling off the stack. It is noted that other embodiments of the segments shown and described herein can be substituted for the segments 61 and 62.

The benefits of the segments as described and shown are that they are simple in design, simple and comparatively inexpensive to produce, easily and economically transportable from an offsite location to an end use site, and lightweight allowing workmen to manually lift, carry, stack and disassemble repeatedly.

Method of Making

A method of making the segment 661 (FIG. 20) is shown in FIG. 24. The other embodiments of segments described above and shown in the drawings can be made by the same or similar method.

The method begins by providing a supply of honeycomb core sheet material 673, cutting the sheet material 673 into individual cores 672, loading an individual core 672 into a container 675, and closing the container 675 to complete assembly of the segment 661. It is noted that the container 675 acts as the outer covering 674 of the segment in the assembled segment 661.

The container 675, for example, comprises self-sealing flaps 675a, 675b, which seal or adhere together when the flaps 675a, 675b are closed. For example, the outer surface of the flap 675b is provided with a layer of self-adhering adhesive, which adheres to the inner surface of the flap 675a when placed in contact therewith when closing the flaps 675a, 675b of the container 675. Alternatively, or in addition, tape 677 is applied to seal the flaps 675a, 675b closed to complete the assembly of the segment 661.

The container 675 can be sealed, for example, by using a pair of sealing roller 681 sequentially moving towards each other. The sealing rollers 681a mounted on actuator arms 681b can be actuated by hydraulic, pneumatic, mechanical, and/or electrical actuators (not shown).

The assembled segments 661 can be loaded into a container 679 for shipment thereof. For example, the segments 661 are stacked inside the container 679 until full. For example, the container 679 is lowered an increment each time a segment 661 is loaded into the container to stack the segments 661 inside the container 679. The container 679 can have flaps or a cover for closing same. Alternatively, the stacked segments can be shrink wrapped for shipment thereof.

The container 672 can be a fiberboard or cardboard (e.g. corrugated cardboard) container. The other surface, and optionally the inner surface, can be treated or coated to make same waterproof; however, still biodegradable.

Another method of making the segment 661 (FIG. 20) is shown in FIG. 25. The other embodiments of segments described above and shown in the drawings can be made by the same or similar method. This method begins by providing a supply of honeycomb core sheet material 673, cutting the sheet wrapping material 673 into individual cores 672, and wrapping an individual core 672 using a sheet material 683 to complete assembly of the segment 661. It is noted that the sheet material 683 acts as the outer covering 674 of the segment in the assembled segment 661.

The sheet wrapping material 683 can be provided with a self-adhering layer provided on one side thereof so that the sheet wrapping material 683 adheres to the outer surface of the core 672 when applied thereto. Alternative, or in addition, tape 677 can be applied to seal the sheet wrapping material 683 when wrapped around the core 672.

The sheet wrapping material 683, for example, can be supplied on a roll 685 to provide a continuous supply thereof. The sheeting wrapping material 683 is unrolled from the roll 685 using a friction roller 687, which drives the sheet wrapping material 683 past a cutter 689 to cut same into individual sheets thereof. The individual sheets of the sheet wrapping material 683 are wrapped around the core 672, for example, using a wrapper 691. For example, the wrapper 691 comprises a U-shaped platen 693 configured to wrap the sheet around the lower edges of the core 672 as shown. A pair of rollers 695a mounted on actuating arms 695b are moved together by hydraulic, pneumatic, mechanical, and/or electrical actuators (not shown) to wrap the sheet material around upper edges of the core 672 to assemble the segment 661.

The assembled segments 661 are lowered into a container 697 for shipping thereof. The container 697 can include self-adhering flaps 697a for sealing same when the flaps 697a are closed. Alternatively, or in addition, the flaps 697 can be taped closed to secured seal the container 697.

From the foregoing detailed description, it will be evident that there are a number of changes, adaptations and modifications of the present invention that come within the province of those having ordinary skill in the art to which the present invention pertains. However, it is intended that all such variations not departing from the spirit of the invention be considered as within the scope thereof as limited solely by the following claims.

The invention claimed is:

1. A method of constructing and staging a pipeline alongside of an in ground trench, the method comprising:
    assembling spaced apart stacks of rectangular prism shaped support segments alongside the trench;
    placing sections of pipe on top of the stacks of support segments;
    centering the sections of pipe on top of the stacks of support segments;
    orienting the support segments transverse relative to the sections of pipe;
    welding the sections of pipe together to construct a pipeline supported on top of the stacks of support segments.

* * * * *